United States Patent [19]

Birkedahl

[11] Patent Number: 4,638,229
[45] Date of Patent: Jan. 20, 1987

[54] ASYMMETRIC TORQUE SWITCHING FOR AIRCRAFT AUTOPILOT

[75] Inventor: Byron F. Birkedahl, Glendale, Ariz.

[73] Assignee: Sperry Corporation, New York, N.Y.

[21] Appl. No.: 765,752

[22] Filed: Aug. 15, 1985

[51] Int. Cl.⁴ .............................................. B64C 13/18
[52] U.S. Cl. ..................................... 318/584; 318/565; 244/180; 244/181
[58] Field of Search ................ 318/584, 565; 244/180, 244/181

[56] References Cited

U.S. PATENT DOCUMENTS 3,934,222  1/1976  Bateman et al. ............. 244/18 D X
4,032,094  6/1977  Morgan et al. ................ 318/565 X
4,281,811  8/1981  Nixon .............................. 318/565 X Primary Examiner—William M. Shoop, Jr.
Assistant Examiner—Saul M. Bergmann
Attorney, Agent, or Firm—Howard P. Terry

[57] ABSTRACT

An apparatus for providing asymmetrical torque-switching for an aircraft autopilot. The invention provides an increased amount of available pitch servo torque at high altitude. The direction of pitch of the aircraft is sensed. An increased amount of torque is provided for the pitch-up direction thereby providing more positive control of the aircraft.

6 Claims, 2 Drawing Figures

ASYMMETRIC TORQUE SWITCHING FOR AIRCRAFT AUTOPILOT

BACKGROUND OF THE INVENTION

1. Field of the Invention

The invention relates to the automatic control of the pitch axis of an aircraft. Specifically, it applies to safe, enhanced pitch axis control of the aircraft at high altitude.

2. Description of the Prior Art

In prior art torque switching aircraft autopilots automatic pitch control of the aircraft has typically included circuitry for providing a high servo torque level at low altitude and a low servo torque level at high altitude. This dual state torque level is incorporated so that the aircraft will not be overcontrolled and become unsafe should a malfunction cause the aircraft to suddenly experience a maximum pitch-down condition. For high altitude operation, the Federal Aviation Administration (FAA) permits a higher level of pitch servo torque in the pitch-up direction than in the pitch-down direction if a G-monitor is incorporated into the autopilot. However, previous autopilots provided the same low servo torque in both pitch directions at high altitude thus providing a safe level of operation in the pitch-down direction, but less than optimal autopilot operation in the pitch-up direction.

The present invention is an asymmetric torque switching circuit which provides an increased amount of available pitch servo torque in the pitch-up direction at high altitude. The G-Monitor will disengage the autopilot during a pitch malfunction before FAA established limits are exceeded.

SUMMARY OF THE INVENTION

The present invention is an asymmetrical torque switching circuit which provides an increased amount of available pitch servo torque at high altitude. The present invention comprises two voltage sense buffers each coupled to a polarity detector. Each voltage sense buffer/polarity detector determines whether the aircraft is in a pitch-up or pitch-down state. If the aircraft is pitching up and in the high altitude state, the first voltage sense buffer outputs a signal placing the autopilot current limiter and current monitor in the high current position, thereby increasing the available pitch servo torque when the aircraft is in a pitch-up condition. In the pitch-down condition while in the high altitude state, no signal is output from the voltage sense buffer/detector and the autopilot current limiter and current monitor remains in the low current state. If the aircraft is pitching up and in the high altitude state, the second buffer/polarity detector outputs a signal to disable the warning annunciator.

DESCRIPTION OF THE PREFERRED EMBODIMENT

Figure 1:
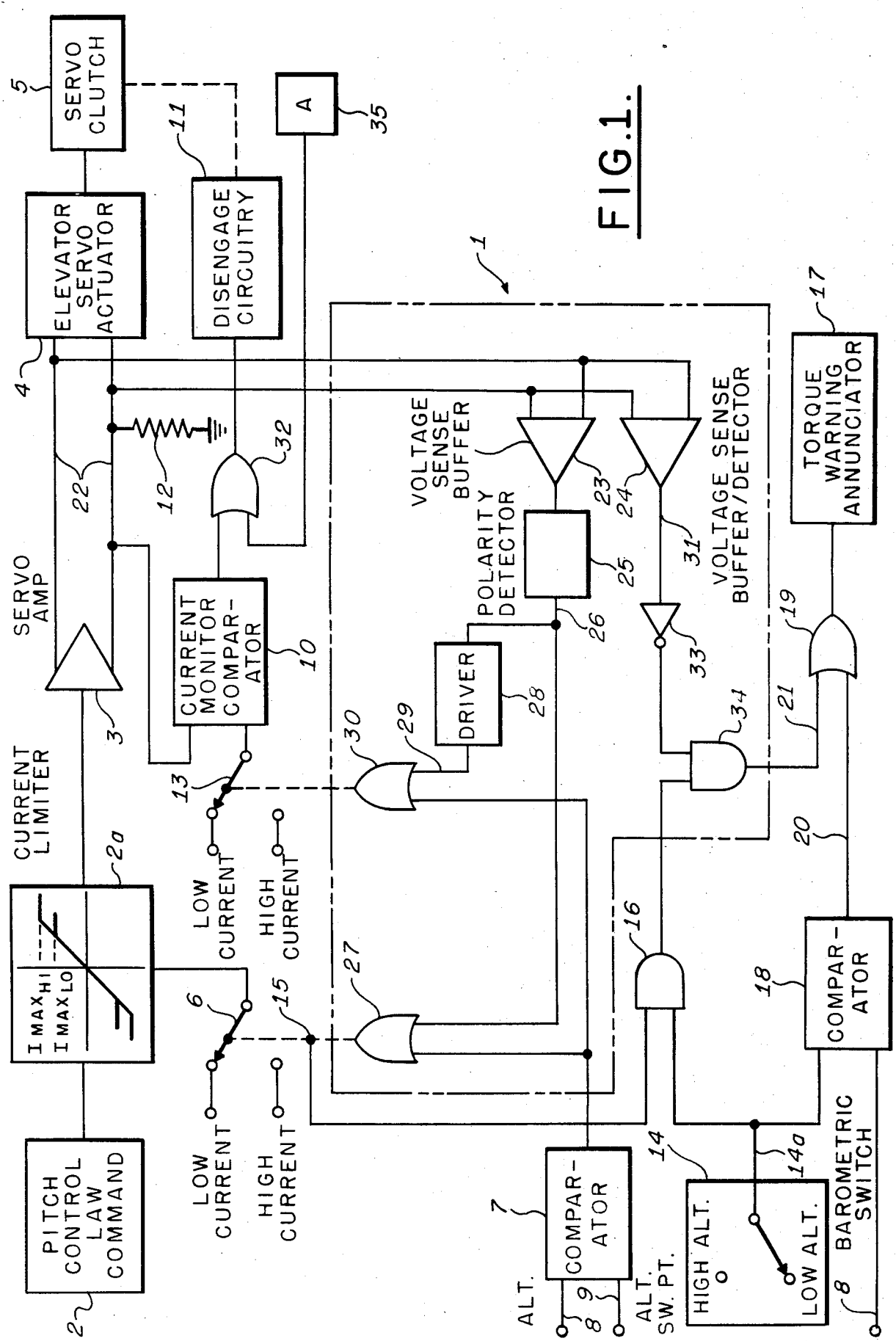
FIG. 1 illustrates a typical two-state torque switching circuit with the present asymmetrical torque switching invention enclosed in the dotted line.
Figure 2:
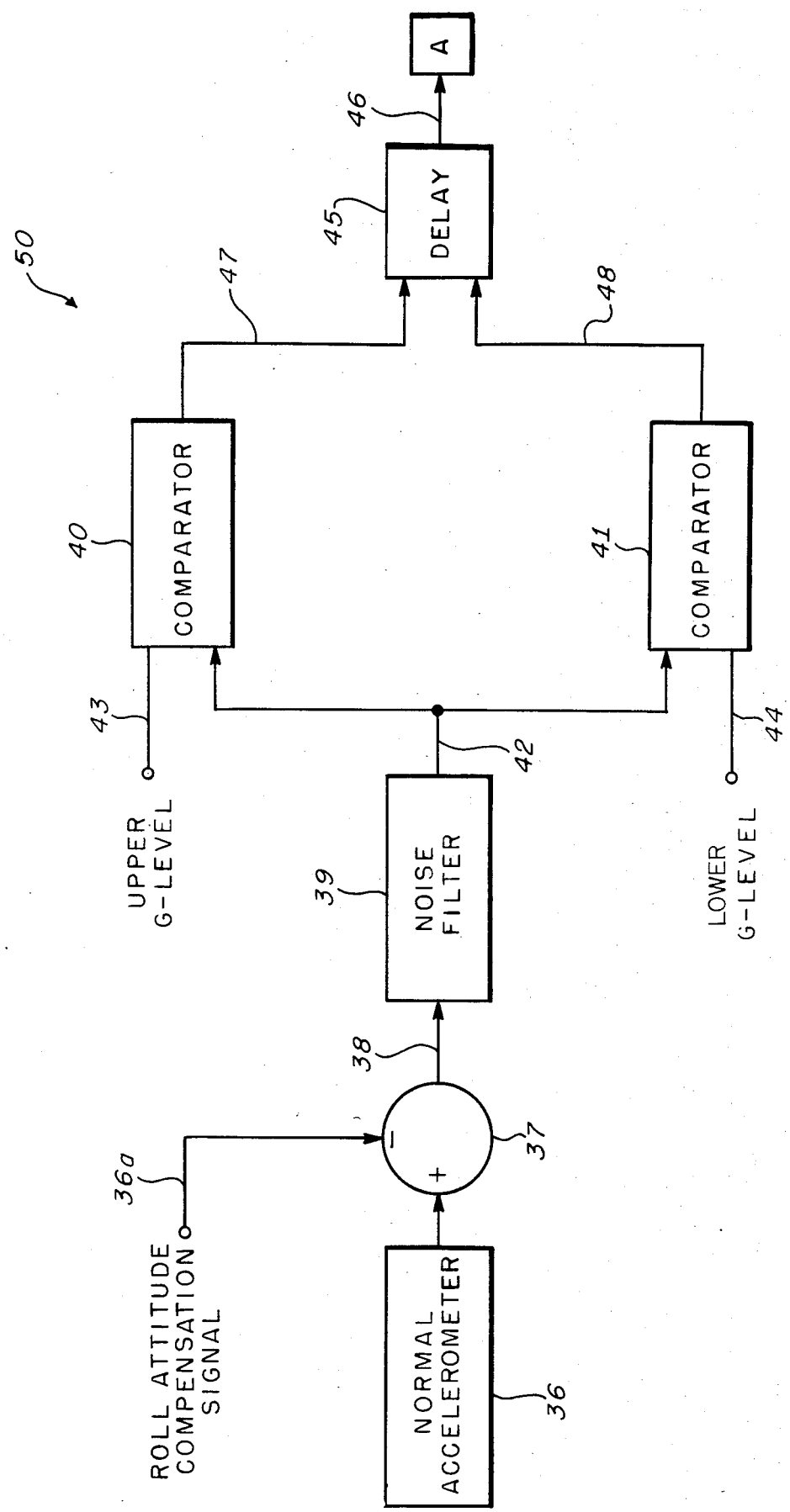
FIG. 2 illustrates the G-monitor circuit used in conjunction with the present invention.

FIG. 1 illustrates the structure of the asymmetric torque switching circuit 1 for a typical autopilot. FIG. 2 shows the structure of the G-monitor 50. Referring now to FIG. 1, a standard pitch axis control signal 2 is sent to a dual-states current limiter 2a. The output of the limiter 2a is provided to the elevator servo amplifier 3 which drives a servo actuator 4. The output of actuator 4 drives the aircraft elevator control surface (not shown) through a clutch 5.

Current limiter 2a limits the amount of torque the actuator 4 can apply through the clutch 5 to the control surface (not shown) should a malfunction occur in the autopilot's pitch control law command signal 2. A non-limited malfunction of the pitch control law signal 2 to the servo amplifier 3 would result in an unsafe aircraft maneuver.

The state of the current limiter 2a is set by a switch 6. The high current or low current position of switch 6 is selected through an OR circuit 27 by a comparator 7. Comparator 7 compares the actual aircraft altitude 8 and a predetermined altitude switch point 9. If actual altitude 8 is above the predetermined altitude switch point 9, the output of OR circuit 27 places switch 6 in the low current position. If actual altitude 8 is below the predetermined altitude switch point 9, switch 6 is placed in the high current position. Thus, two maximum torque levels are available from the servo actuator 4 to drive the elevator control surfaces; a lower current level at the altitudes above the switch point, and a higher current level at altitudes below the switch point. The actual current limit and switch point altitude are selected from flight test data to limit a pitch malfunction to a safe aircraft maneuver.

In addition to the current limiter 2a, a current monitor comparator 10 is incorporated to insure that the output of the servo amplifier 3 is not excessive due to a current limiter 2a or a servo amplifier 3 malfunction. Should an excessive current condition occur, it is detected by current monitor comparator 10. An output signal is sent through an OR circuit 32 to disengage circuitry 11 which will cause servo clutch 5 to disengage the control surfaces. The current monitor 10 compares the actual servo current sensed from resistor 12 and the high or low current level signal from switch 13. The position of switch 13 is controlled by altitude comparator 7 through OR circuit 30.

To insure that the current limiter switch 6 has not erroneously switched to an incorrect state, a barometric switch 14 output signal 14a and current limiter control signal 15 are compared by AND circuit 16. If the current limiter switch 6 is set to the high current state (corresponding to low altitude) and the barometric switch 14 is in the high altitude position, AND circuit 16 will output a signal to illuminate a torque warning annunciator 17. As a check that the barometric switch 14 has not failed, an additional comparator 18 compares the barometric switch output 14a with actual aircraft altitude signal 8. The torque warning annunciator 17 is controlled by an OR circuit 19 which will illuminate annunciator 17 if a barometric switch miscomparison signal 20 or a torque state miscomparison signal 21 is present at the input of OR circuit 19.

Asymmetrical torque switching of the present invention is accomplished as follows: The polarity of servo amplifier output signal 22 is sensed by voltage sense buffer 23 and voltage sense buffer/detector 24. The output voltage sense buffer 23 drives a polarity detector 25 that determines which direction the servo actuator 4 is pitching the aircraft. If a pitch-up condition exists, polarity detector output signal 26 is provided to OR circuit 27 which will set the current limiter switch 6 into the high current position, regardless of whether actual altitude 8 is above or below altitude switch point 9. Pitch-up signal 26 is also supplied to a driver circuit 28. Driver output signal 29 is supplied to OR circuit 30 which sets the current monitor switch 13 to the high current state if the elevator servo actuator 4 is providing a pitch-up signal to servo clutch 5. In accordance with the present invention, a pitching up command to the servo actuator while switches 6 and 13 are in the low current position will be sensed by voltage sense buffer 23 and automatically cause switches 6 and 13 to be switched to the high current position as previously described. However, this would normally cause illumination of the torque warning annunciator 17. To inhibit the annunciator 17, an output signal 31 from the voltage sense buffer/detector 24 is inverted by invertor 23 and supplied to AND circuit 34. AND circuit 34 combines the signal from the torque state comparison and circuit 16 and the invertor 33. The output of the AND circuit 34 drives the torque warning annunciator 17 through OR circuit 19. Thus, a pitch-up condition will automatically place the torque switching circuitry into the high torque state and will prevent the torque warning annunciator 17 from illuminating (unless a barometric switch fault is detected). The additional torque obtained by this method in the pitch up direction greatly enhances the performance capabilities of the autopilot in controlling the aircraft. When the control law attempts to control with more torque authority than is available, poor performance, for example oscillations in the flight path is usually the result.

The G-monitor circuit 50 shown in FIG. 2 generates a disengage signal 46 if excessive aircraft G-loading is detected. The G-monitor as used with the asymmetric torque-switching circuit in FIG. 1 assures that there will be a low probability of a pitch malfunction causing an unsafe pitch maneuver. The G-monitor is required with the asymmetrical switching feature since a larger pitch malfunction maneuver is possible in the pitch-up direction than with the standard torque-switching. The G-monitor 50 operates as follows: The output signal from a normal accelerometer 36 and roll attitude compensation signal 36a from the autopilot (not shown) are subtracted in summer 37. The roll normalized signal 38 is filtered in noise filter 39 and applied to an upper G-level comparator 40, and a lower G-level comparator 41. The upper level comparator 40 compares the filtered normalized acceleration signal 42 to a predetermined upper G-level limit 43. The lower level comparator 41 compares the filtered, normalized acceleration signal 42 to a predetermined lower G-level limit 44. The outputs of comparators 40 and 41 are sent to delay circuit 45. The delay circuit output 46 will only activate if either the upper level comparator output signal 47 or the lower level comparator output signal 48 activates for a predetermined time interval (typically 200 ms.). If either of the comparator signals 47 or 48 reset, then the delay resets, and comparators 40 and 41 must again activate for the full delay time to get a disengage signal 46. This resetting delay prevents turbulence from tripping the G-monitor. The activation of the delay causes a signal 46 to be sent through OR circuit 32 shown in FIG. 1 to the disengage circuitry.

While the invention has been described in its preferred embodiments, it is to be understood that the words which have been used are words of description rather than limitation and that changes may be made within the purview of the appended claims without departing from the true scope and spirit of the invention in its broader aspects.

I claim:
1. Apparatus for providing asymmetrical torque switching at high altitude in an aircraft autopilot of the type having a first and second state current limiter for limiting maximum pitch maneuvers of said aircraft, a current monitor for disengaging said autopilot in case of malfunction and a torque warning annunciator for alerting aircraft crew of said aircraft if said autopilot malfunctions, said apparatus comprising:
   a first sensing means for determining polarity of a signal representative of direction of pitch of said aircraft and for providing a first signal when said aircraft pitch is upward,
   means coupled to said first sensing means for providing a first switching signal to said autopilot for switching said current limiter to a first state upon receipt of said first signal,
   means coupled to said first sensing means for providing a second switching signal to said autopilot for switching said current monitor to said first state upon receipt of said first signal,
   a second sensing means for determining polarity of said signal representative of direction of pitch of said aircraft and for providing a second signal when said aircraft pitch is upward,
   means coupled to said second sensing means for providing a third switching signal to said autopilot for inhibiting output of said annunciator upon receipt of said second signal, and
   means to monitor G-loading of said aircraft for providing a signal to disengage said autopilot when said aircraft G-load exceeds a predetermined limit.

2. Apparatus in accordance with claim 1 wherein said first sensing means includes a voltage sense buffer and a polarity detector.

3. Apparatus in accordance with claim 1 wherein said means coupled to said first sensing means for providing a first switching signal comprises an OR logic circuit.

4. Apparatus in accordance with claim 1 wherein said means coupled to said first sensing means for providing a second switching signal comprises an OR logic circuit.

5. Apparatus in accordance with claim 1 wherein said means coupled to said second sensing means for providing a third switching signal comprises an AND logic circuit.

6. Apparatus in accordance with claim 1 wherein said means to monitor G-loading of said aircraft comprises:
   summer means for receiving first and second input signals representative of normal acceleration and roll attitude compensation and for providing an output signal, said output signal being the difference of said first and second input signals,
   first comparator means, coupled to receive said summer output signal and a signal representative of a predetermined upper G-level limit, for providing a first comparator output signal when said summer output signal exceeds said signal representative of said upper G-level limit,
   second comparator means, coupled to receive said summer output signal and a signal representative of a predetermined lower G-level limit, for providing a second comparator output signal when said summer output signal is less than said signal representative of said lower G-level limit,
   delay means coupled to receive said first and second comparator output signals and for providing a disengage output signal when either first or second comparator output signal is received by said delay means for a selected time period.

* * * * *